United States Patent

Magrane

[15] 3,673,490
[45] June 27, 1972

[54] COMBINED ALTERNATOR AND IGNITION TRIGGER SIGNAL GENERATOR WITH ARRANGEMENT FOR SUPPRESSING SPURIOUS TRIGGER SIGNALS

[72] Inventor: Robert T. Magrane, Agawam, Mass.

[73] Assignee: R. E. Phelon Company, Inc., East Longmeadow, Mass.

[22] Filed: Sept. 29, 1970

[21] Appl. No.: 76,451

[52] U.S. Cl. ................................322/50, 310/70, 310/153
[51] Int. Cl. ..........................................................H02p 9/40
[58] Field of Search.............310/70, 45, 67, 153, 156, 159, 310/168, 169, 170, 68, 68 D, 49; 322/50, 91; 123/148 E, 149, 149 D

[56] References Cited

UNITED STATES PATENTS

| | | | |
|---|---|---|---|
| 2,583,466 | 1/1952 | Brownlee | 310/153 |
| 3,405,347 | 10/1968 | Swift | 322/91 |
| 3,554,179 | 1/1971 | Burson | 123/148 E |
| 3,218,492 | 11/1965 | Babitzka | 310/70 |
| 3,527,972 | 9/1970 | Franz | 310/68 D |
| 2,446,761 | 8/1948 | Harmon | 310/153 |
| 3,484,677 | 12/1969 | Piteo | 322/91 |

Primary Examiner—J. D. Miller
Assistant Examiner—R. Skudy
Attorney—McCormick, Paulding & Huber

[57] ABSTRACT

An alternator driven by an internal combustion engine is combined with a trigger signal generator for generator voltage signals used to trigger the breakerless ignition system of the engine. The alternator includes a flywheel having a rim carrying a plurality of main permanent magnets for inducing voltage waveforms in main generating coils located on a stator core positioned adjacent the rotor. The trigger signal generator comprises a triggering magnet and coil assembly located adjacent the path of a flux varying member residing radially inwardly of the path of movement of the main magnets. The production of spurious trigger signals in the trigger coil by the leakage flux of the main magnets is suppressed by both a magnetic shunt, physically positioned between the triggering magnet and coil assembly and the path of the main magnets, providing a lower reluctance path for the leakage flux which path bypasses the triggering magnet and coil assembly and by constructing the flux varying member and the triggering magnet and coil assembly in such a form as to cause the induction in the trigger coil of voltage pulses which occur simultaneously with and counteract such spurious signals.

12 Claims, 11 Drawing Figures

PATENTED JUN 27 1972 3,673,490

INVENTOR
ROBERT T. MAGRANE

BY
McCormick, Paulding & Huber
ATTORNEYS

COMBINED ALTERNATOR AND IGNITION TRIGGER SIGNAL GENERATOR WITH ARRANGEMENT FOR SUPPRESSING SPURIOUS TRIGGER SIGNALS

BACKGROUND OF THE INVENTION

This invention relates to permanent magnet alternators adapted to be driven by internal combustion engines, and deals more particularly with such an alternator as combined with a generator for producing voltage signals for triggering an electrically triggered ignition system forming part of the associated internal combustion engine.

With internal combustion engines, particularly those of smaller size commonly used in powering lawn mowers, chain saws, ski-mobiles, small boats and the like, it is now well known to use a permanent magnet alternator which includes one or more permanent magnets carried by the rim of the engine flywheel and which cooperates with a fixed stator assembly for generating power for firing the sparkplug or plugs of the engine and possibly also for battery charging and/or for powering other auxiliary equipment used with the engine. It is also well known to utilize, with such engines, breakerless ignition systems wherein the timing of the firing of the sparkplug or plugs is controlled by an electrically triggered component such as a silicon controlled rectifier, and it is also well known to produce such triggering signals by a trigger signal generator including a trigger coil located close to the flywheel and dependent upon the rotation of the flywheel for the induction of a triggering signal therein. For the sake of compactness, the trigger coil is often located, in such a situation, relatively close to the path of movement of the main permanent magnet or magnets and within the leakage flux field established by such magnet or magnets. Therefore, as the main magnet or magnets rotate, they tend to include voltage waveforms in the trigger coil which, particularly at higher speeds of the engine, may reach the triggering level and produce so-called "maverick" sparks at the sparkplug or plugs, these maverick sparks being sparks which occur at undesired times in the operating cycle of the engine.

The object of the present invention is therefore to provide a combined alternator and trigger signal producing means wherein the effect of the leakage flux of the main magnets of the alternator is suppressed or counteracted so that the trigger coil may be located relatively close to the path of movement of the main magnet or magnets and within the leakage field thereof without the production of spurious triggering signals resulting in maverick sparks.

SUMMARY OF THE INVENTION

The invention resides primarily in a combined permanent magnet alternator and ignition trigger signal generator for use in combination with an internal combustion engine. The alternator consists of a rotor, which may be carried by the flywheel of the engine and which includes one or more main permanent magnets fixed to the flywheel rim. These main magnets cooperate with a main stator carrying one or more main coils for producing a main supply of electrical power used for powering the ignition system and/or for other purposes. A triggering magnet and coil assembly for generating triggering signals used to trigger the ignition system of the engine is located radially inwardly of the rotor and cooperates with a flux varying member also located radially inwardly of the rotor and connected with the rotor for rotation therewith. A magnetic shunt consisting of a piece of magnetic material is located generally between the triggering magnet and coil assembly and the path of movement of the main magnet or magnets so as to provide a low reluctance path for the leakage flux of the main magnet or magnets which would otherwise tend to pass through the trigger coil, thereby reducing the effect of the leakage flux on the voltage induced in the triggering coil. When the rotor includes a plurality of main magnets, such magnets tend to induce in the trigger coil a ripple type of waveform including a plurality of spaced pulses of the same polarity as the triggering signal. To counteract these latter ripple pulses, the shape of the flux varying member is such as to induce in the trigger coil time spaced voltage pulses of opposite polarity occurring substantially simultaneously with such ripple pulses so as to counteract the latter and prevent the coil output voltage from reaching the triggering level between triggering pulses. Preferably, the triggering magnet and coil assembly includes two pole faces spaced angularly of the path of movement of the flux varying member and the flux varying member consists of a circumferentially extending pole face comprised of a plurality of circumferentially extending surfaces of stepwise increasing radius of curvature so that a counteracting pulse is induced in the triggering magnet and coil assembly each time said pole faces pass from one of said circumferentially extending surfaces to the next.

DESCRIPTION OF THE PREFERRED EMBODIMENT

Figure 1:
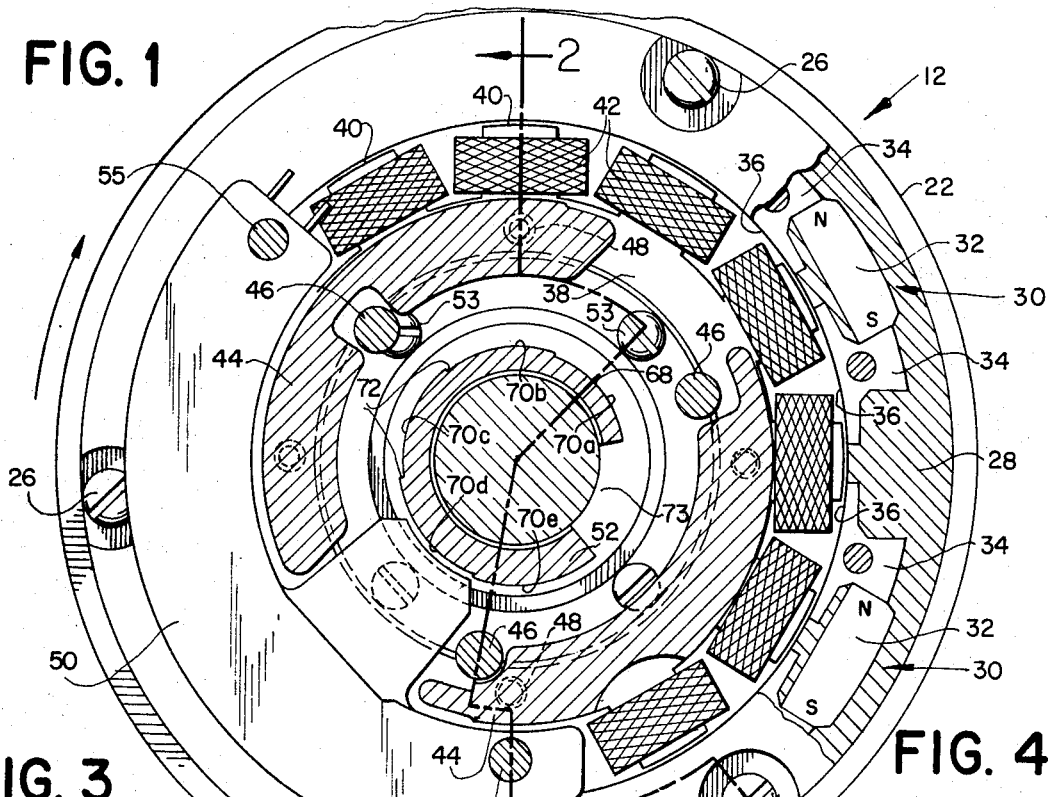
FIG. 1 is a transverse sectional view taken on the line 1—1 of FIG. 2 through a combined alternator and trigger signal producing means embodying this invention.
Figure 2:
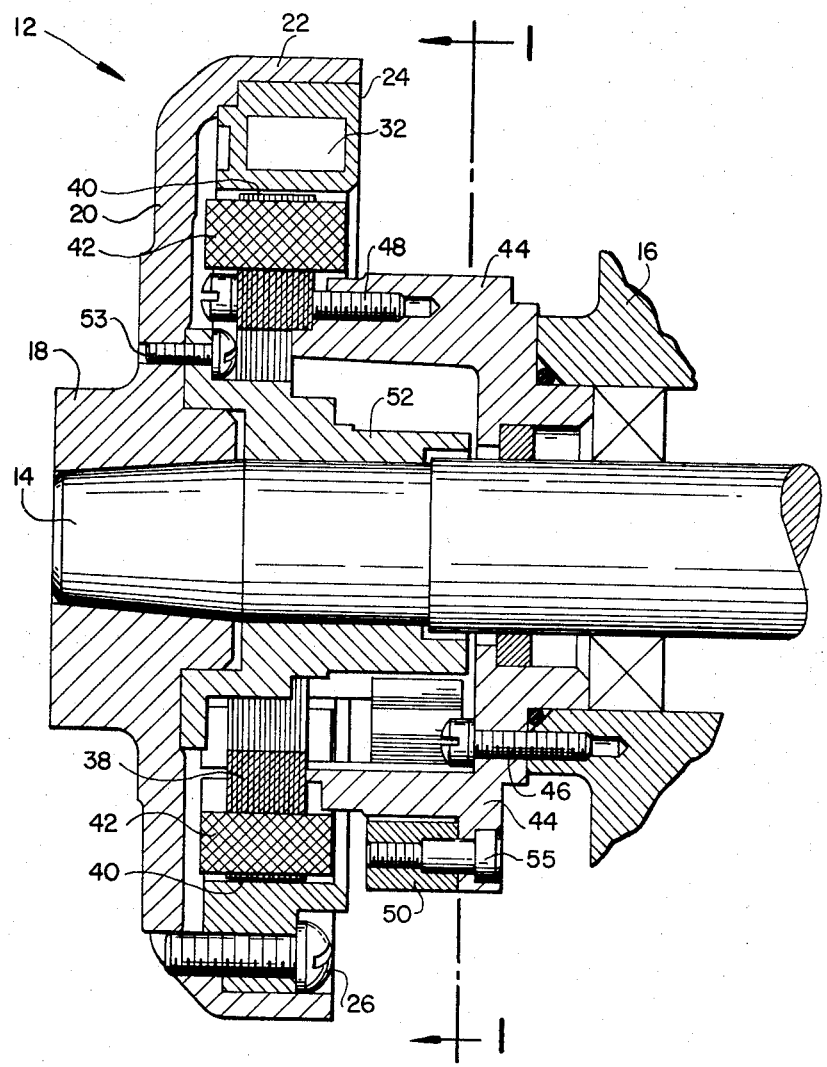
FIG. 2 is a longitudinal sectional view taken on the line 2—2 of FIG. 1.

Turning first to FIGS. 1 and 2, these figures show a combined alternator and ignition trigger signal producing means embodying this invention. The illustrated alternator comprises a member 12 which rotates in synchronism with the operation of the associated engine. This member may take various different forms, but as shown, also serves as the flywheel of the engine and is attached to the engine crankshaft 14. It is therefore referred to herein as a flywheel rotor and may be considered to consist of a flywheel functioning mainly as part of the engine and a rotor functioning mainly as part of the alternator. The reference numeral 16 represents part of the stationary structure of the engine, and of course the engine may vary considerably as to its construction and design and forms by itself no part of the present invention. The flywheel portion of the member 12 includes a hub portion 18, a radially extending web portion 20, and an axially extending rim portion 22. Contained within the rim 22 and forming the rotor portion of the member 12, is a magnet annulus 24 retained in the rim by three screws 26, 26. The magnet annulus 24 consists of a body 28 of non-magnetic material, such as die-cast aluminum or aluminum alloy, and has embedded therein six magnet assemblies spaced uniformly relative to one another along the circumferential length of the annulus with two such assemblies being indicated generally at 30 in FIG. 1 and revealed by part of the non-magnetic body 28 being broken away. Each magnet assembly 30 comprises a tangentially charged permanent magnet 32 and two pole pieces 34, 34 of magnetic material engaging opposite magnetic poles of the magnet and each providing a pole face 36 on the radially inner surface of the annulus. Therefore, the six magnet assemblies 30, 30 provide a total of twelve pole faces 36, 36 spaced along the inner surface of the annulus and of alternating magnetic polarity.

The magnet annulus 24 rotates as the shaft 14 rotates and cooperates with a fixed stator assembly located generally within the rim 22. This stator assembly consists of a generally annular core 38 of magnetic material, preferably laminated, having a plurality of radially outwardly extending poles 40, 40, there being twelve such poles in the illustrated case, thereby adapting the alternator to the production of a single phase output. Each pole 40 in turn receives a main generating coil 42 in which voltage waveforms are induced in a conventional manner as the rotor rotates due to changes in the main magnet flux passing through each pole. As shown in FIGS. 1 and 2, the stator core 38 is supported from the fixed structure 16 of the engine by two arcuately shaped supporting members 44, 44 of non-magnetic material, the supporting members being fixed to the engine structure 16 by fasteners 46, 46 and the stator core being fixed to the supporting members 44 by fasteners 48, 48.

Figure 3:
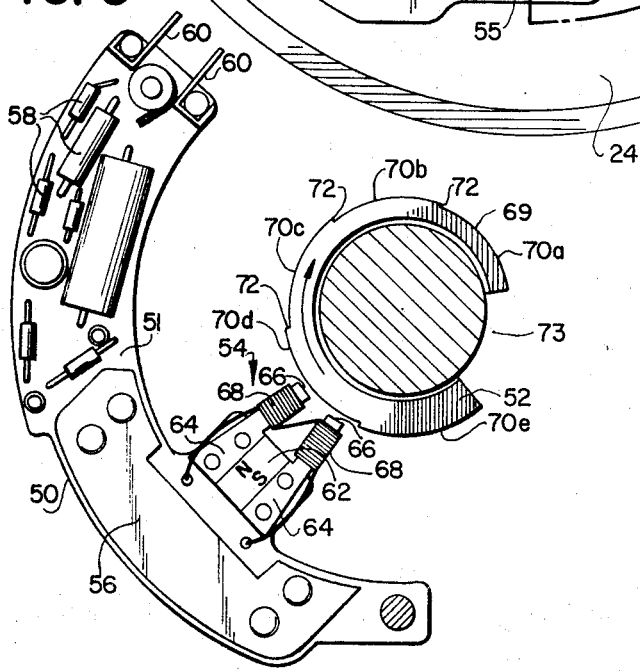
FIG. 3 is a view taken on the same plane as FIG. 1 and shows the triggering magnet and coil assembly of FIG. 1 and the associated parts of its module with the potting material thereof removed.
Figure 4:
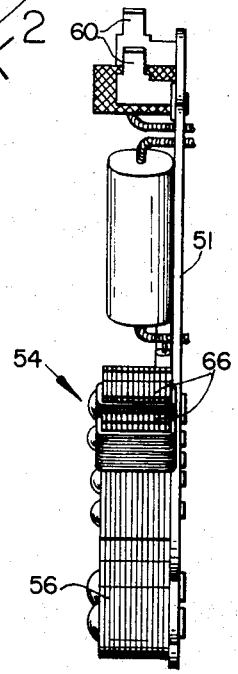
FIG. 4 is an end elevational view of the parts shown in FIG. 3.

The trigger signal generator combined with the alternator described above, comprises, as shown in FIGS. 1 and 2, a triggering module 50 and a flux varying means cooperable therewith in the form of a generally annular member 52 of magnetic material surrounding the shaft 14 and located radially within the flywheel flange, 22, the piece 52 being connected to the flywheel by fasteners 53, 53. Considering first the triggering module 50, it is a generally arcuately shaped unit fixed to the two supporting members 44, 44 by two screws 55, 55 and consists of a number of parts potted in a suitable plastic potting material to form such parts into a unitary package and to achieve other advantages such as water-proofing and rigidity. FIGS. 3 and 4 show the triggering module 50 with the potting material removed and, referring to these figures, the module 50 includes an arcuate mounting board 51 of electrical insulating material having fixed thereto a triggering magnet and coil assembly, indicated generally at 54, a magnetic shunt 56 and, to one side of the magnetic shunt 56, a number of electronic components 58, 58 and terminal lugs 60, 60.

The triggering magnet and coil assembly 54 includes a permanent magnet 62 located between two legs 64, 64 of magnetic material, preferably laminated, which extend radially inwardly of the magnet 62 toward the flux varying member 52 and terminate respectively in two angularly spaced pole faces 66, 66. Each of the legs 64, inwardly of the magnet 62, receives a trigger coil 68 with the two trigger coils 68, 68 being connected in series aiding relationship with one another. As far as is pertinent here, the two trigger coils 68, 68 function substantially similar to a single coil, and indeed in some situations the triggering magnet and coil assembly may include only one such coil placed on only one of the legs 64, 64. Thereafter, as used hereinafter, and especially in the claims, the term "trigger coil" is intended to refer to either a single coil or to two or more coils connected in series as are the coils 68, 68.

The flux varying member 52 has an outer circumferentially extending pole face 69 which moves past the pole faces 66, 66 of the triggering magnet and coil assembly with an air gap therebetween. As will be noted best in FIG. 1 and FIG. 3, the pole face 69 of the member 52 consists of a number of circumferentially extending surfaces 70a to 70e each of which along its circumferential length is of a uniform radial spacing from the axis of the member 52 and each of which is separated from the next succeeding surface 70 by a small radial step 72. The direction of rotation of the flywheel rotor and member 52 is indicated by the arrows in FIGS. 1 and 3, and therefore it will be observed that after the first surface 70a is moved past the triggering pole faces 66, 66, the air gap between such pole faces and the member 52 is progressively decreased in a stepwise fashion as the member 52 continues to rotate until the surface 70e having a maximum radius is moved past the pole faces 66, 66. Following the surface 70e of maximum radius is a gap 73 between it and the surface 70a of minimum radius. It will therefore be understood that as the member 52 rotates to bring the surfaces 70a to 70e in succession past the pole faces 66, 66, the air gap is changed in a stepwise fashion and as each stepwise change in the air gap is reached, the flux is suddenly increased to produce a corresponding pulse in the voltage waveform induced in the triggering coil 68, 68 to serve a purpose hereinafter explained in more detail. Additionally, it will be understood that as the maximum radius surface 70e is moved past the pole faces 66, 66, the flux through the trigger coils 68, 68 is suddenly reduced to produce a relatively high amplitude pulse in the triggering coils. This latter pulse is the triggering pulse used to trigger the ignition system of the associated engine and of which the components 58, 58 mounted on the board 50 form a part.

Figure 11:
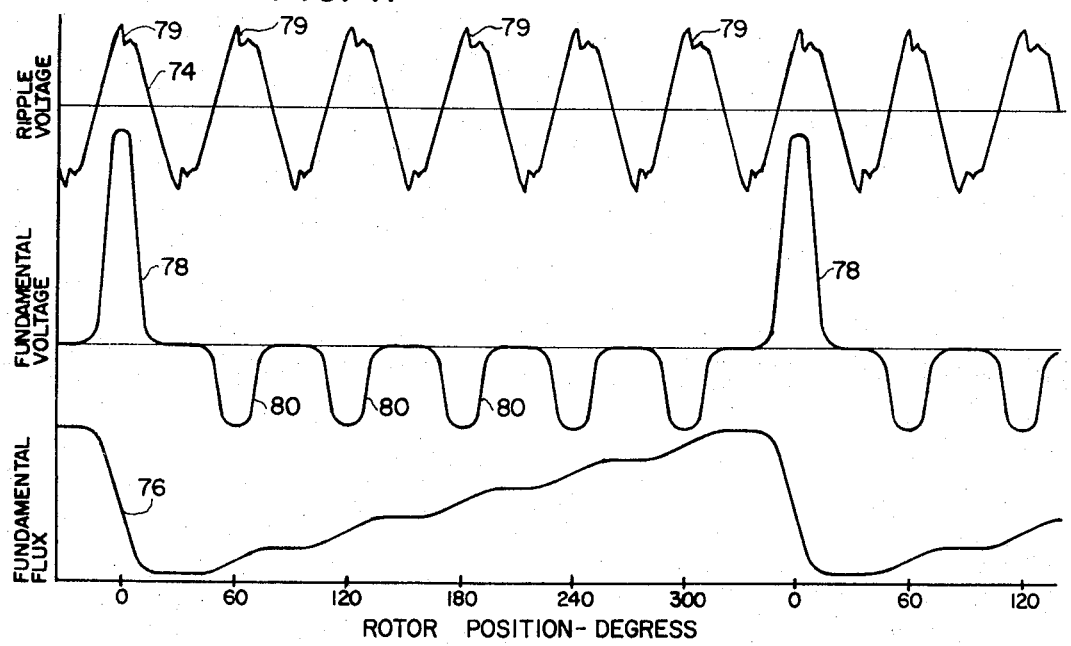
FIG. 11 is a diagram illustrating, from top to bottom, the ripple voltage waveform induced in the triggering coil by the leakage flux of the main magnets, the fundamental voltage induced in the trigger coil by the flux of the triggering magnet, and the flux of the triggering magnet through the trigger coil at different rotor positions.

Before proceeding with the remainder of the description of the triggering module 50, it should be understood that the main magnets 32, 32 carried by the flywheel rim and included in the magnet annulus 24 establish a field of leakage flux extending in all directions outwardly from the magnet annulus, and due to the uniform angular spacing of the magnets 30, 30 and the pole pieces 34, 34 around the magnet annulus, this leakage field at the location of the triggering magnet and coil assembly 54 will fluctuate in a cyclical manner as the rotor is rotated, and since some of this leakage flux will pass through the trigger coils 68, 68, it will induce in such triggering coils a voltage waveform, referred to as a ripple voltage, of a repetitive nature. In FIG. 11, the curve 74 represents the waveform of such ripple voltage. It will be noted that since the magnets 30, 30 of the magnet annulus are spaced 60° from each other, the ripple voltage induced in the trigger coils 68, 68 by the main magnets 30, 30 will have a 60° period. At low rotor speeds, the maximum amplitude of the ripple voltage is relatively low. However, at high speeds of the engine, the amplitude of the ripple voltage waveform increases and unless counteracted as hereinafter explained it is possible that it may exceed the voltage level required for triggering the associated electronic switch of the ignition circuit, thereby causing a maverick spark at the spark plug of the engine.

To overcome the problem of maverick sparks, the triggering module 50, as best shown in FIGS. 3 and 4, includes the magnetic shunt 56 which is a piece of magnetic material, preferably laminated, located radially outwardly of the triggering magnet and coil assembly 54 and generally within the radial zone between the triggering magnet and coil assembly and the main magnets 30, 30, and it extends for some distance arcuately to either side of the triggering magnet and coil assembly. The magnetic shunt 56 therefore serves to provide a low reluctance path for the leakage flux appearing in the vicinity of the triggering magnet and coil assembly, and as the result such flux tends to flow through the shunt 56 rather than through the triggering coils 68, 68. Accordingly, the shunt 56 by bypassing leakage flux around the trigger coils 68, 68 reduces the amplitude of the ripple voltage induced in the triggering coils and thereby reduces the possibility of the ripple voltage reaching the triggering level.

To further reduce the possibility of maverick sparking, the shape of the flux varying member 52 is such as to induce in the trigger coil 68, 68 pulses of a polarity opposite that of the triggering pulse and counteracting those pulses of the ripple voltage which are of the same polarity as the triggering pulse. This is best understood by reference to FIGS. 5 to 11. FIGS. 5 to 10 show the member 52 at different positions relative to the triggering magnet and coil assembly 54, the illustrated positions being spaced 60° from each other. FIG. 11 shows the ripple voltage waveform, represented by the line 74, induced in the triggering coil by the leakage flux of the main magnets. It also shows the flux produced by the triggering magnet 62 passing through the trigger coils at different rotor positions, this flux being referred to as the fundamental flux and shown by the line 76. The voltage induced in the trigger coils by the fundamental flux is referred to as the fundamental voltage and, as shown in FIG. 11, consists of large amplitude positive pulses 78, 78 and somewhat smaller amplitude negative pulses 80, 80.

Figure 5:
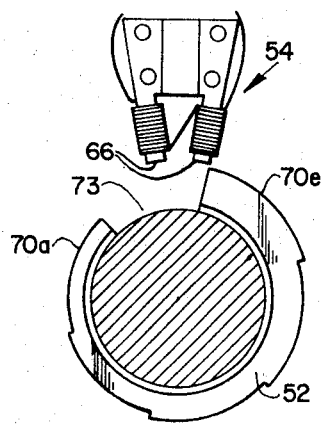
FIGS. 5 to 10 are figures showing the relationship between the triggering magnet and coil assembly and the flux varying member at different positions of the rotor with the illustrated rotor positions being displaced 60° from each other.
Figure 6:
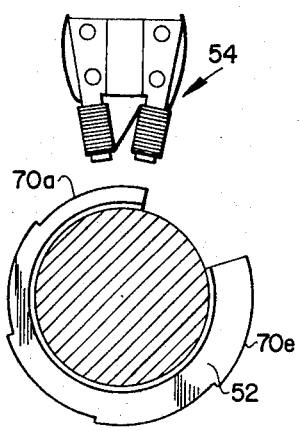
Figure 7:
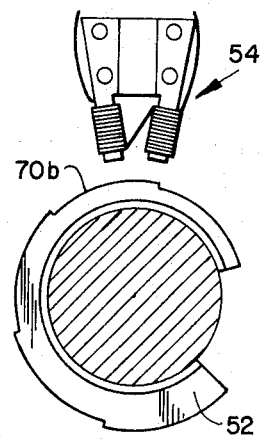
Figure 8:
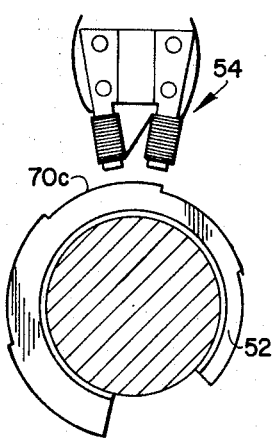
Figure 9:
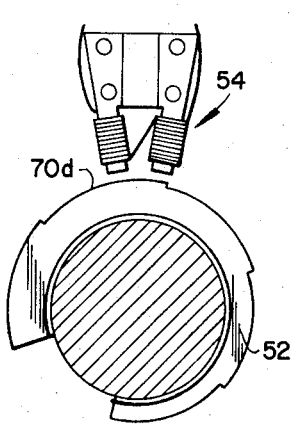
Figure 10:
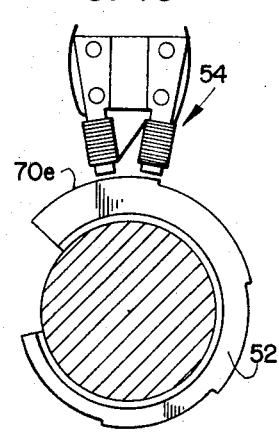

FIG. 5 shows the member 52 positioned at what is herein taken to be the 0° rotor position, this position being that at which the maximum diameter surface 70e is moved beyond the pole faces 66, 66, of the triggering magnet and coil assembly 54 and at which the latter pole faces are brought into alignment with the gap 73 in the member 52. Therefore, at this point, the flux through the triggering magnet and coil assembly changes from a high value to a low value, as shown by FIG. 11, and produces a high amplitude positive pulse 78 which is a triggering pulse used for triggering the silicon controlled rectifier or other triggered electronic switch of the associated ignition circuit. As the member 52 moves 60° from its FIG. 5 position to its FIG. 6 position, little change in flux through the triggering magnet coil assembly occurs until the member 52 reaches its FIG. 6 position, at which time the minimum radius surface 70a is brought into alignment with the pole faces 66, 66 and produces a somewhat increased flux through the trigger coils. This change in flux occurring in the vicinity of the 60° rotor position induces a negative pulse 80 in the trigger coils. This negative pulse 80 if further timed to occur substantially simultaneously with one of the positive pulses 79, 79 of the ripple voltage waveform 74 induced in the trigger coils by the main magnet leakage flux, and accordingly these two voltages are superimposed on one another with the result that the output voltage of the triggering coils is substantially less than the peak value of the ripple pulse.

FIGS. 7, 8, 9 and 10 show the member 52 at other 60° positions at which the pole faces of the triggering magnet and coil assembly 54 move from one surface of the member 52 to another surface of larger radius to increase the trigger magnet flux through the trigger coils and induce a negative pulse 80 therein opposing a simultaneously occurring positive ripple pulse 79.

From the foregoing, it will therefore be understood that the steps in the pole face of the member 52 are arranged so that the change in flux through the triggering coils caused thereby occurs substantially simultaneously with the pulses 79, 79 of the ripple voltage which are of the same polarity as the triggering pulses 78, 78. Therefore each time a ripple pulse of the same polarity as the triggered pulse is induced in the triggering coils by the main magnet leakage flux, a bucking pulse of opposite polarity is induced in the triggering coils by the triggering magnet flux which in superposition with the ripple voltage reduces the amplitude of the output voltage from the triggering coils and prevents it from rising to the triggering level between successive triggering pulses 78, 78.

The above described trigger signal generator is particularly adapted for use with a capacitor discharge ignition system wherein a capacitor is charged and then at the desired time of firing is discharged, by the triggering of an associated silicon controlled rectifier or the like, through the primary winding of a step-up transformer the secondary winding of which is connected to the spark plug. The components 58, 58 shown in FIG. 3, except for the step-up transformer, constitute all of the components required for such a capacitor discharge ignition system and are appropriately interconnected with themselves and with the triggering magnet and coil assembly for this purpose. Immediately following the firing the capacitor is of course in a discharged state and no maverick spark can occur until after the capacitor is thereafter charged to a substantial level. Depending on various design factors, this charging of the capacitor may require varying degrees of rotor rotation, and therefore in some such designs one or more of the initial bucking pulses 80, 80 following each triggering signal may not be required and the flux varying member 52 may accordingly be designed with a lesser number of steps in its pole face. Of course, the number of magnets in the magnet annulus may also vary, which will vary the number of ripple pulses occuring in each revolution of the rotor, and the flux varying member must be designed to suit the particular number of magnets so that each bucking pulse occurs substantially simultaneously with a ripple pulse of the same polarity as the triggering pulse.

I claim:

1. In a combined alternator and ignition trigger signal generator for use with an internal combustion engine, the combination comprising: a rotor including at least one permanent main magnet for movement therewith in a circular path, a main stator located adjacent said circular path and comprised of a core of magnetic material and at least one main coil on said core arranged to have a voltage waveform induced therein by said at least one main magnet as said rotor rotates, a flux varying member located radially inwardly of said circular path and connected with said rotor for rotation therewith, a triggering magnet and coil assembly cooperable with said flux varying member and between said circular path and said flux varying member, and a magnetic shunt separate from said main stator core and consisting of a piece of magnetic material located generally between said triggering magnet and coil assembly and said circular path so as to provide a low reluctance path for leakage flux from said at least one main magnet which would otherwise tend to pass through said triggering magnet and coil assembly.

2. The combination defined in claim 1 further characterized by said triggering magnet and coil assembly comprising a sub-assembly consisting of a triggering magnet and an associated core of magnetic material, said triggering magnet and said latter core in combination providing two pole faces of opposite magnetic polarity spaced angularly along the path of movement of said flux varying member, and at least one trigger coil mounted on said sub-assembly.

3. The combination defined in claim 1 further characterized by said triggering magnet and coil assembly comprising a triggering magnet, two pieces of magnetic material engaging opposite pole faces of said triggering magnet and extending radially inwardly therefrom toward said path of movement of said flux varying member, and at least one trigger coil mounted on one of said pieces of magnetic material.

4. The combination defined in claim 1 further characterized by a board on which said triggering magnet and coil assembly and said magnetic shunt are mounted, said board including a portion thereof extending arcuately in one direction beyond said shunt, and a plurality of electronic components mounted on said arcuately extending portion of said board which components are interconnected with themselves and with said triggering magnet and coil assembly to form a major part of the ignition system for said internal combustion engine.

5. The combination as defined in claim 4 further characterized by a quantity of potting material surrounding said board, said electronic components, said triggering magnet and coil assembly and said magnetic shunt to form all of said latter parts into a unitary module.

6. The combination defined in claim 1 further characterized by there being a plurality of main magnets included in said rotor and spaced angularly from one another along said circular path, said triggering magnet and coil assembly including a triggering magnet and a trigger coil, said flux varying member including means for varying the flux of said triggering magnet through said trigger coil in such a manner as to induce in said trigger coil and at one rotor position a triggering pulse of one polarity and to induce in said trigger coil at other rotor positions pulses of opposite polarity timed to occur substantially simultaneously with ripple pulses induced in said trigger coil by the leakage flux of said plurality of main magnets.

7. The combination defined in claim 6 further characterized by said flux varying member comprising a generally annular piece of magnetic material having a circumferentially extending pole face, said pole face including a plurality of circumferentially extending surfaces each of which is of a substantially constant radius along its circumferential length and the radii of which surfaces progressively increase in going from one circumferential surface to the next.

8. The combination defined in claim 7 further characterized by said flux varying member including a circumferentially extending gap between the one of said circumferentially extending surfaces having a maximum radius and the one of said circumferentially extending surfaces having minimum radius.

9. The combination defined in claim 8 further characterized by said triggering magnet and coil assembly comprising a sub-assembly consisting of a triggering magnet and an associated core of magnetic material, said triggering magnet and said latter core in combination providing two pole faces of opposite magnetic polarity spaced angularly along the path of movement of said flux varying member, and at least one trigger coil mounted on said sub-assembly.

10. In a combined alternator and ignition trigger signal generator for use with an internal combustion engine, the combination comprising: a rotor including a plurality of permanent main magnets angularly spaced about the axis thereof for rotation therewith along a circular path, a main stator located adjacent said circular path and comprising a core of magnetic material and at least one main generating coil on said core arranged to have a voltage waveform induced therein by said main magnets as said rotor rotates, a flux varying member connected with said rotor for rotation therewith, and a triggering magnet and coil assembly located adjacent said flux varying member for cooperation therewith, said triggering magnet and coil assembly including triggering magnet and a trigger coil, and said flux varying member including means for varying the flux of said triggering magnet through said trigger coil in such a manner as to induce in said trigger coil and at one rotor position a triggering pulse of one polarity and to induce in said trigger coil at other rotor positions pulses of opposite polarity timed to occur substantially simultaneously with ripple pulses induced in said trigger coil by the leakage flux of said plurality of main magnets.

11. The combination defined in claim 10 further characterized by said triggering magnet and coil assembly comprising a sub-assembly consisting of said triggering magnet and an associated core of magnetic material, said triggering magnet and said latter core in combination providing two pole faces of opposite magnetic polarity spaced angularly along the path of movement of said flux varying member, said trigger coil being mounted on said sub-assembly, and said flux varying member comprising a generally annular piece of magnetic material having a circumferentially extending pole face, said pole face including a plurality of circumferentially extending surfaces each of which is of substantially constant radius along its circumferential length and the radii of which surfaces progressively increase in going from one circumferential surface to the next.

12. The combination defined in claim 11 further characterized by said flux varying member including a circumferentially extending gap between the one of said circumferentially extending surfaces having a maximum radius and the one of said circumferentially extending surfaces having a minimum radius.

* * * * *